UNITED STATES PATENT OFFICE.

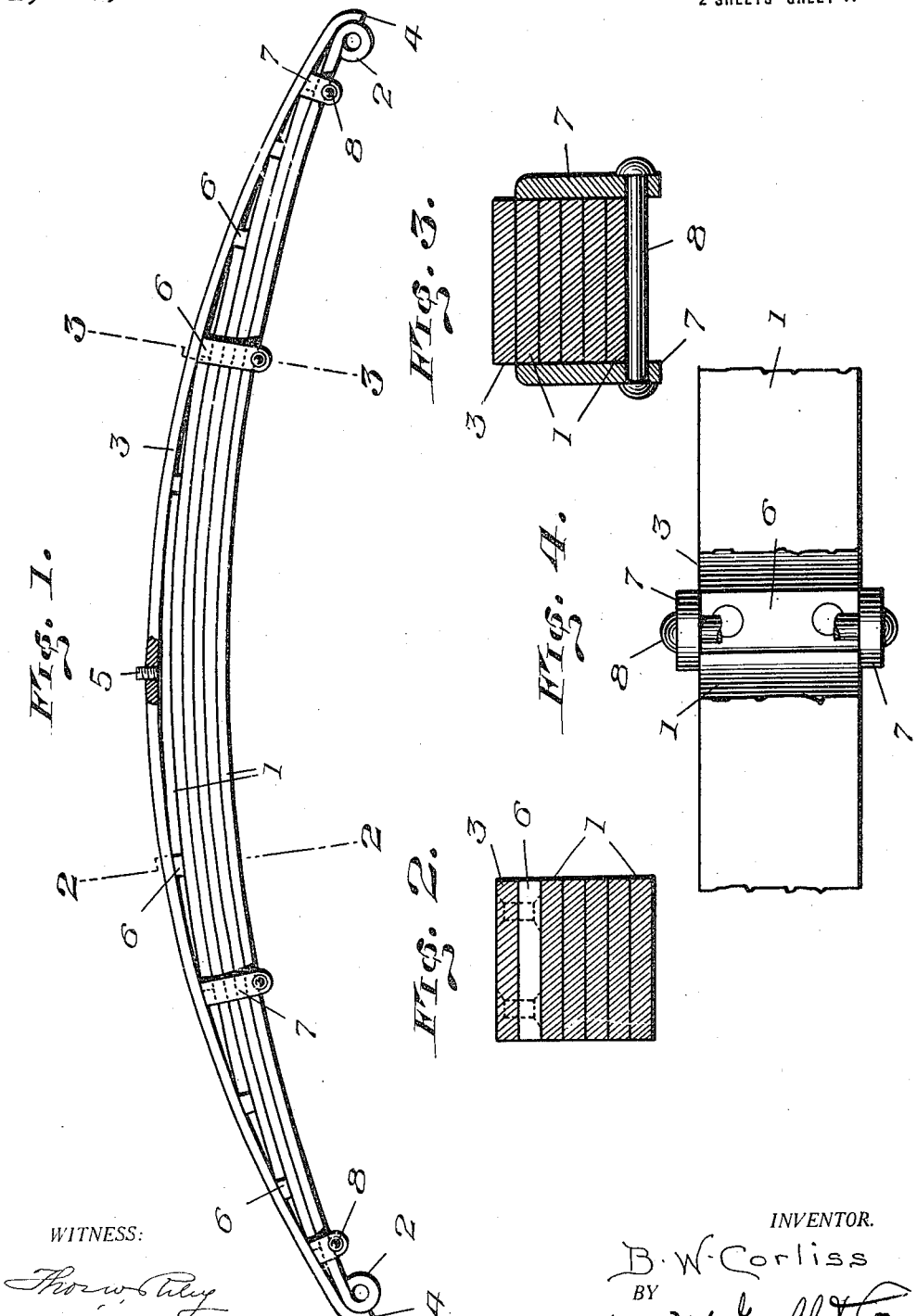

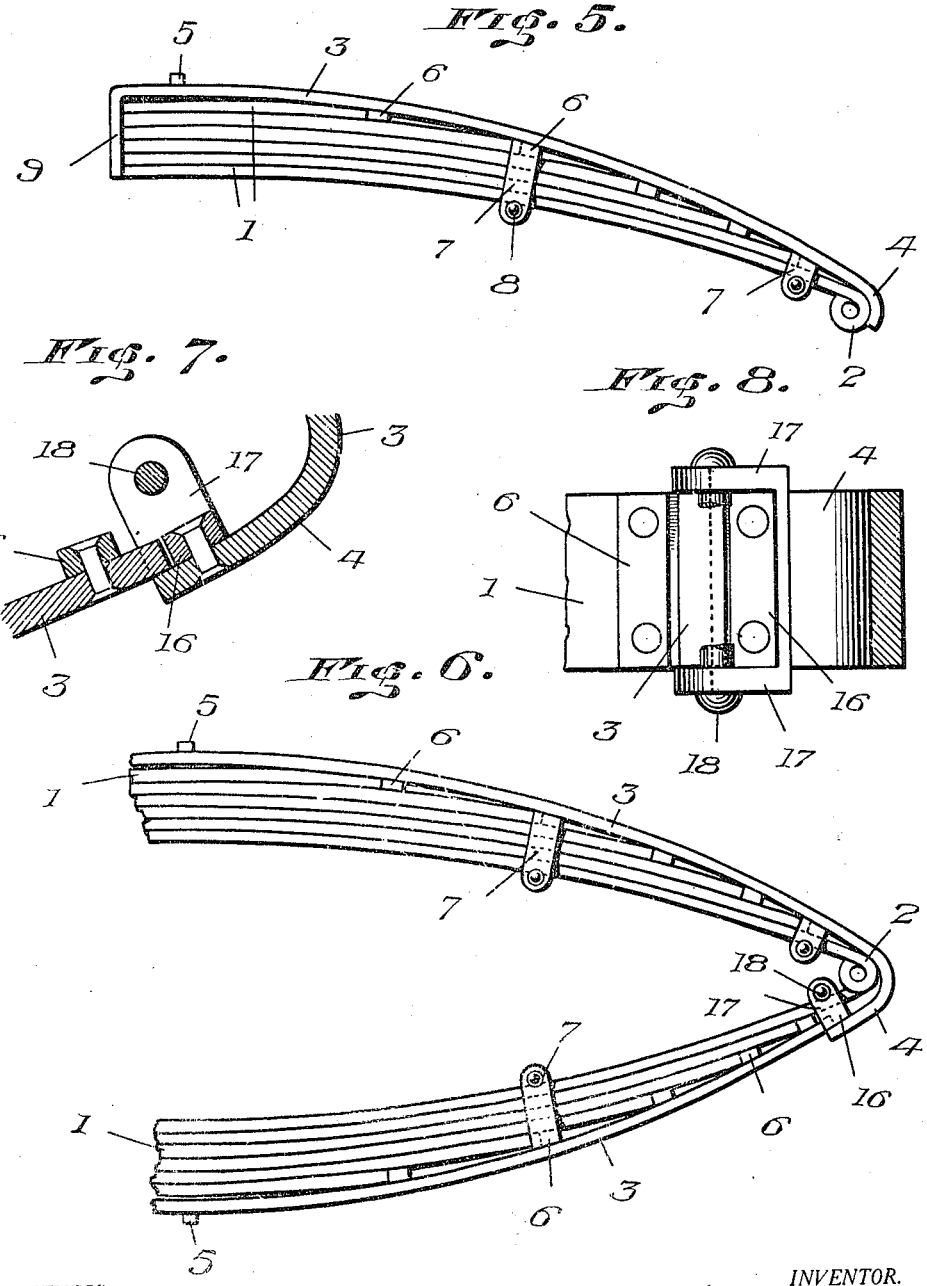

BENJAMIN W. CORLISS, OF CALAIS, MAINE.

VEHICLE-SPRING.

1,317,778.  Specification of Letters Patent.  Patented Oct. 7, 1919.

Application filed February 5, 1919. Serial No. 275,097.

*To all whom it may concern:*

Be it known that I, BENJAMIN W. CORLISS, a citizen of the United States, residing at Calais, in the county of Washington and State of Maine, have invented certain new and useful Improvements in Vehicle-Springs; and I do hereby declare the following to be a full, clear, and exact description of the invention, such as will enable others skilled in the art to which it appertains to make and use the same.

The present invention relates to laminated leaf springs, such as commonly used in vehicles, and it is the object of the invention to provide novel and improved means for holding the leaves of such springs assembled without the necessity of drilling holes through or otherwise weakening the leaves, as have proven a source of annoyance due to the springs breaking at such weakened portions.

Another object is the provision of a device adapted to be placed on and attached to the leaves of a laminated spring, in order to retain the leaves in position in an effective and practical manner, the construction being comparatively simple and inexpensive, and being adaptable to various styles of laminated springs with equal propriety and success.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation showing a semi-elliptical laminated spring embodying the improvements, a portion being broken away.

Fig. 2 and 3 are enlarged cross sections on the respective lines 2—2 and 3—3 of Fig. 1.

Fig. 4 is an enlarged fragmentary bottom view, with portions broken away to show one of the cleats or abutments having the side pieces or straps.

Fig. 5 is a side elevation showing a modification, the spring being of half length as compared to the spring shown in Fig. 1.

Fig. 6 is a side elevation of an elliptical spring having the improvements applied, there being slight variations due to the use of the improvements on both sections of the spring, portions being broken away.

Fig. 7 is an enlarged sectional detail showing the joints between the ends of the two strips used for holding the leaves assembled.

Fig. 8 is a plan view of the parts shown in Fig. 7.

The spring shown in Fig. 1 is of bowed or semi-elliptical form and comprises the superposed arcuate leaves or laminæ 1, which decrease in length progressively as usual in a spring of this type, but in using the present improvements, the ends of the leaves are preferably not reduced in thickness or tapered off, so as to present shoulders or abutments, as seen in Fig. 1, whereby the ends of the leaves provide a stepped arrangement. The longest leaf 1, as shown, is provided at its ends with the sleeves or eyes 2 for attaching the ends of the spring to an object, such as the body of a vehicle, axle, or the like.

In carrying out the invention, a strip or bar 3 of untempered metal is bent so as to extend longitudinally over the leaves, at that side opposite to the longest leaf, or over the projecting ends of the leaves, and this strip can be readily bent into place against the ends of the leaves in applying the device to the spring. The ends of the strip 3, as shown in Fig. 1, are preferably bent partially around, as at 4, the eyes 2, to assist in holding the strip in position on the spring, and at its intermediate portion, the strip 3 is provided with a stud or pin 5 that will enter an aperture or recess in the clamp (not shown) that embraces the intermediate portion of the spring and strip 3 to attach the spring to another object, such as the axle, body or other part of a vehicle. Any suitable clamp can be used to embrace the spring and secure it to an object without the necessity of drilling holes through the spring and thus weakening it, and although the clamp secures the spring to the respective object, and does not prevent the endwise creeping of the leaves 1, this is avoided by the strip 3 and parts carried thereby.

Riveted or otherwise secured to the inner or under side of the strip 3 are cleats or abutments 6 disposed transversely, and so arranged as to abut or be disposed adjacent to the ends of the leaves 1, thereby preventing relative longitudinal displacement of the leaves other than the natural movement due to the flexing action as the spring bends.

Some of the cleats 6 are provided at their ends with downwardly or inwardly extending straps 7 extending across the edges of the corresponding leaves 1, and having their inner ends connected by transverse tie members 8, which may be rivets, bolts or other securing elements. In this way, the cleats 6 which have the straps 7 provide clamps to embrace the leaves and thus prevent sidewise displacement thereof, as well as clamping the leaves together and holding the strip 3 in place. These straps 7 can be used on those cleats 6 where thought best and serve to hold the terminal portions of the leaves together, while the abutments prevent endwise displacement. If desired, the straps 7 can be wider than the cleats 6, so as to overlap the edges of the leaves which abut against the respective cleats, as seen in Fig. 4. In other words, by this arrangement, the end of the leaf which abuts the cleat extends between the straps 7, so as to prevent this end of the leaf from being displaced sidewise.

The device is simple, consisting of the strip 3 with the cleats secured thereto, and can be quickly applied to the spring to hold the leaves thereof assembled, without the necessity of drilling holes through the spring, and without interfering with the flexure of the spring.

Fig. 5 shows a spring of half length, as compared with the spring shown in Fig. 1, the leaves 1 being cut off square at one end, and the corresponding end of the strip 3 is bent at an angle, as at 9, so as to extend across the ends of the leaves 1 and hold them against endwise movement in one direction, while the abutments 6 prevent endwise movement in the other direction. The construction is the same as shown in Fig. 1, with the exception that the leaves and strap are both cut off, and the strip is bent to overlap the butt end of the spring. Figs. 6, 7 and 8 show the invention as used in an elliptical spring, constituting two sections such as shown in Fig. 1, the eyes 2 being used for hinging the ends of the sections together, and each section having a strip 3 applied to the leaves, as above explained. One strip 3 is shorter than the respective spring, so as to terminate short of the ends thereof, and the ends of the other strip 3 project beyond the ends of the respective spring, and are bent back, as at 4, so as to overlap the ends of the shorter strip. A transverse cleat 16 similar to the cleat 6 is riveted or otherwise secured transversely to the inner side of each bent back portion 4, for the abutment of the ends of the shorter strip 3, to hold the shorter strip against endwise displacement, and each cleat 16 is provided with inwardly extending straps 17 extending across the edges of the respective spring and connected by a tie member 18, which may be a rivet, bolt or the like, thus providing a clamp for securing the portion 4 to the opposite spring and also retaining the end of the shorter strip in place against the spring. The end of the shorter spring can extend between the straps 17 to prevent sidewise or edgewise displacement thereof. In this type of spring, the strips 3 extend completely around the same, and each strip is assembled with the corresponding spring leaves in substantially the same manner as above described.

Having thus described the invention, what is claimed as new is:—

1. A laminated spring having leaves terminating in stepped arrangement, and a strip clamped to the leaves and extending longitudinally over the terminals thereof, and provided with abutments for said terminals.

2. A laminated spring having leaves terminating in stepped arrangement, a strap extending longitudinally over the terminals of said leaves, and provided with abutments adjacent to said terminals to prevent endwise displacement of the leaves, and means for clamping the leaves together and clamping the strip thereto.

3. A laminated spring having leaves terminating in stepped arrangement, a strip extending longitudinally over the terminals of said leaves, cleats secured to said strip to abut the terminals of the leaves, and means for clamping the leaves together and the strip to the leaves.

4. A laminated spring comprising leaves terminating in stepped arrangement, a strip extending longitudinally over the terminals of said leaves, said strip having abutments at the terminals of the leaves to prevent endwise displacement thereof, straps extending from the strip across the edges of the leaves, and means connecting the straps to clamp the parts together.

5. A laminated spring comprising leaves terminating in stepped arrangement, a strip extending longitudinally over the terminals of the leaves, cleats secured to the strip to abut the terminals of the leaves, some of the cleats having straps extending from the ends thereof across the edges of the leaves, and means connecting the straps to hold the parts together.

In testimony whereof I have signed my name to this specification in the presence of two subscribing witnesses.

BENJAMIN W. CORLISS.

Witnesses:
W. H. PHINNEY,
CHAS. E. COOKSON.

Copies of this patent may be obtained for five cents each, by addressing the "Commissioner of Patents, Washington, D. C."